July 11, 1939.    R. D. MARX    2,165,640
TANK TRUCK VALVE
Filed April 20, 1937    2 Sheets-Sheet 1
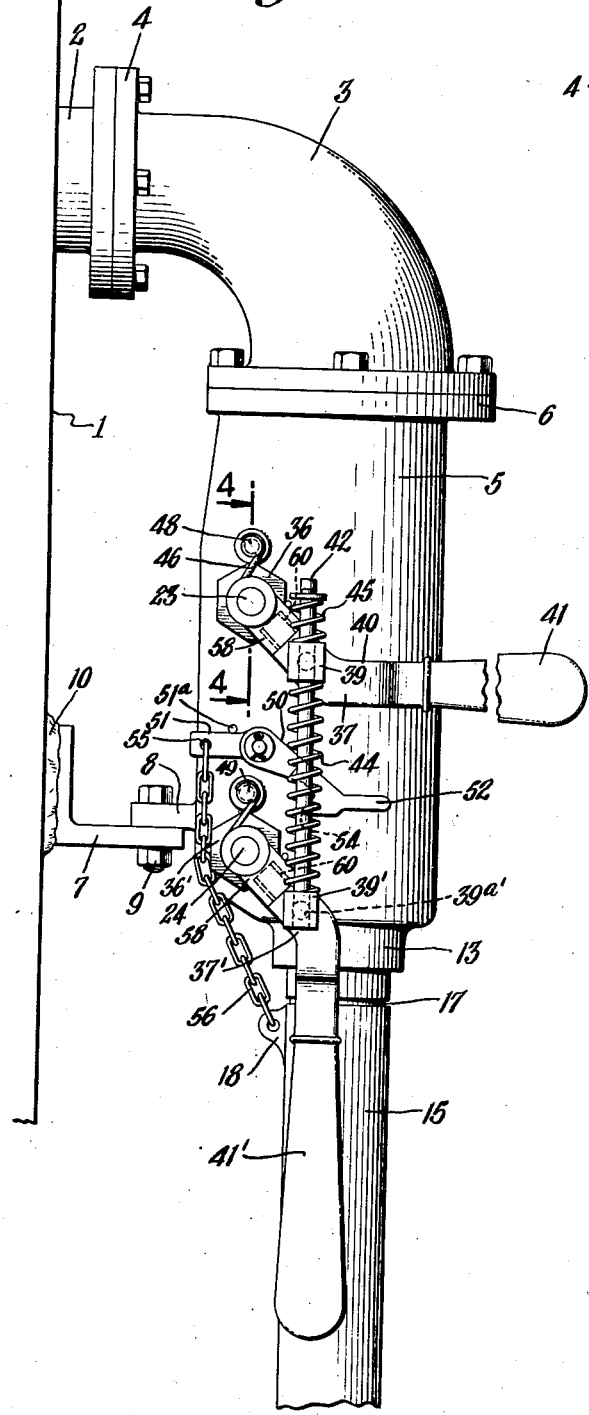
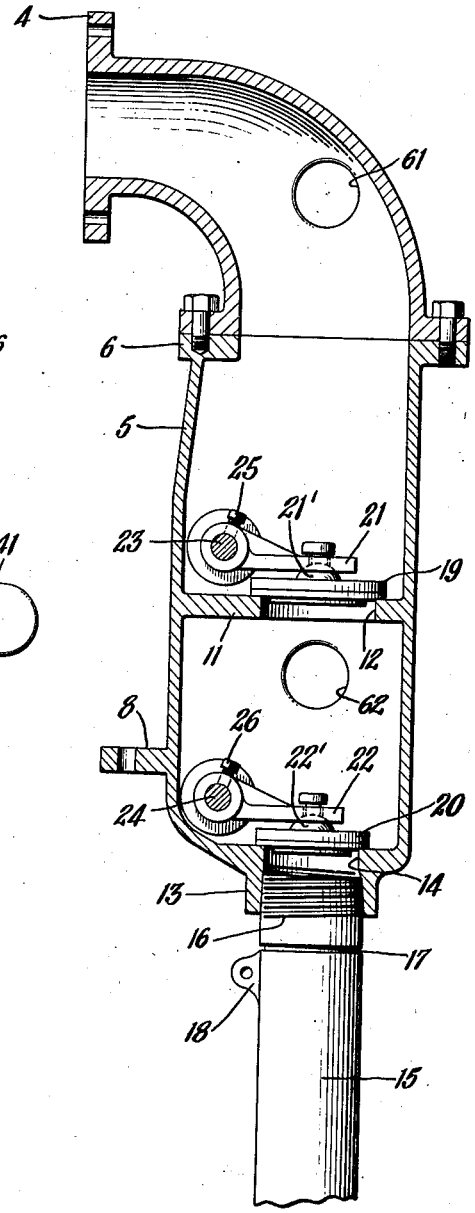
INVENTOR
Robert D. Marx
BY
Morgan, Finnegan and Durham
ATTORNEYS July 11, 1939.  R. D. MARX  2,165,640
TANK TRUCK VALVE
Filed April 20, 1937  2 Sheets-Sheet 2
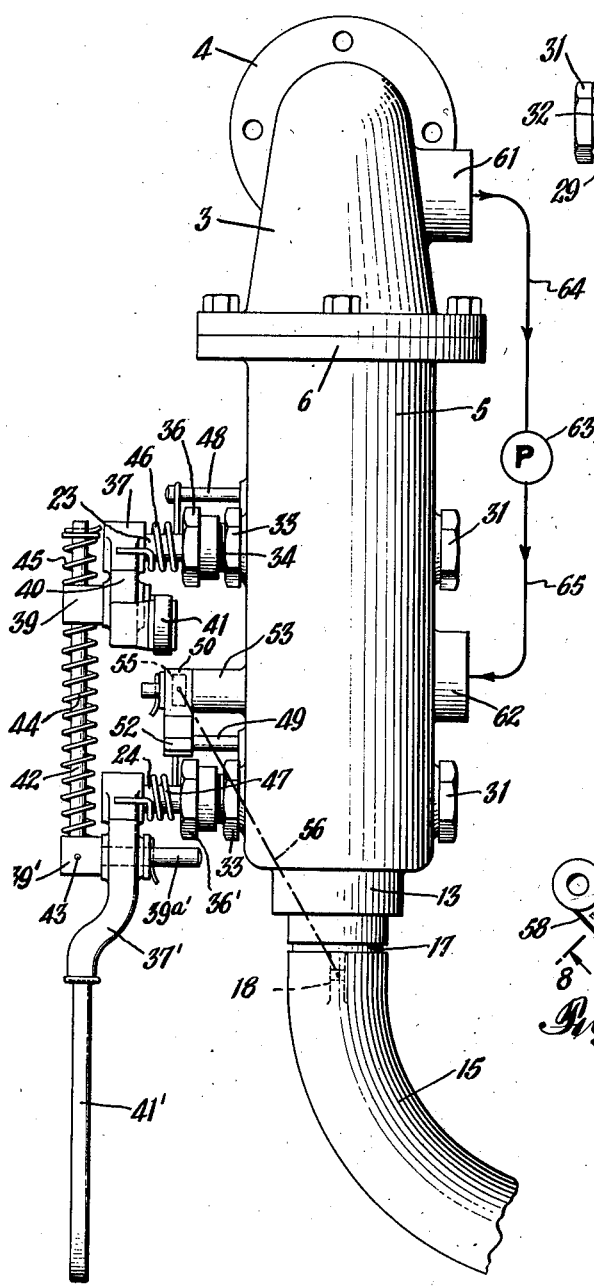
Fig. 3.
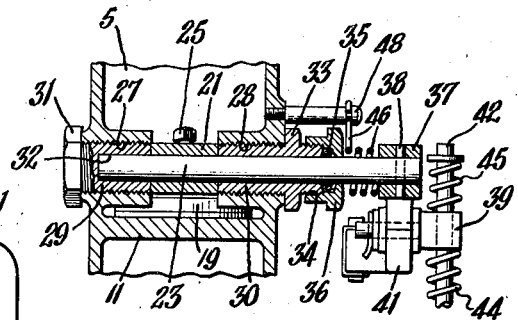
Fig. 4.
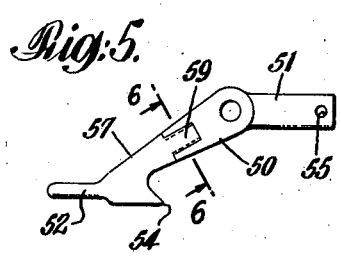
Fig. 5.
Fig. 6.
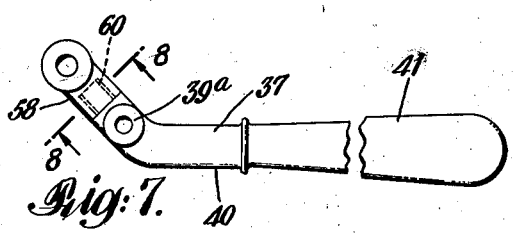
Fig. 7.
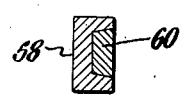
Fig. 8.
INVENTOR
Robert D. Marx
BY
Morgan Finnegan & Durham
ATTORNEYS Patented July 11, 1939

2,165,640

UNITED STATES PATENT OFFICE 2,165,640

TANK TRUCK VALVE

Robert D. Marx, Brooklyn, N. Y.

Application April 20, 1937, Serial No. 137,899

13 Claims. (Cl. 137—21)

This invention relates to a device for dispensing inflammable fluids, and refers in particular to a faucet for dispensing gasoline or other inflammable fluids from a vehicular tank car, such as a tank truck.

It is an object of the invention to provide a new and improved device of the type indicated, to provide in such device a structure which is more positive and economical as a safety factor than in devices heretofore proposed, and to provide a device which is not subject to corrosion as in such previous devices.

Other objects and advantages of the invention reside in the structure, arrangement and combination of parts hereinafter described and illustrated in the drawings, wherein like reference characters indicate like parts in the several views, and in which:

Fig. 1 is an elevational view of a device constructed in accordance with the invention;

Fig. 2 is a view partly in section of the device illustrated in Fig. 1;

Fig. 3 is a view taken at right angles to Fig. 1;

Fig. 4 is a view taken on the line 4—4 of Fig. 1;

Fig. 5 is a detail view of a portion of the device shown in Figs. 1 and 3;

Fig. 6 is a view taken on line 6—6 of Fig. 5;

Fig. 7 is a detail view of another portion of the device shown in Figs. 1 and 3; and Fig. 8 is a view taken on line 8—8 of Fig. 7.

Referring to the drawings, the reference character 1 indicates in general the rear end of a vehicular tank car such, for example, as a tank truck used in dispensing gasoline to various service stations. A pipe 2 provides a syphon connection with the interior of the tank car in a manner well known in the art. An elbow 3 is connected to the pipe 2 by suitable means such as the flanged coupling 4. A hollow elongated casing 5 is connected to the elbow 3 by suitable means such as the flanged coupling 6. The casing 5 may be supported near its lower end by means of the angle iron 7, lug 8, and nut and bolt 9. The angle iron 7 may be attached to the rear end of the tank car 1 by any suitable means such as the welding 10.

The casing 5 is provided intermediate its ends with a partition 11 provided with an opening 12, and at its lower end with a nipple 13 provided with an opening 14. A pipe 15, preferably of brass, is secured to the nipple 13 by suitable means such as the screw threads 16. The pipe 15 is provided with a portion 17 of reduced diameter and with a lug 18 for a purpose to be hereinafter explained.

The openings 12 and 14 in the casing 5 are adapted to be closed by the flap valves 19 and 20, respectively. These valves are mounted on the ends of arms 21 and 22 by means of the ball and socket connections 21' and 22', respectively. Such a connection provides a positive seating of the valves irrespective of wear in material and misalignment of parts. The arms 21 and 22 are rigidly attached to shafts 23 and 24 by suitable means such as set screws 25 and 26, respectively.

The openings 12 and 14 are eccentrically arranged with respect to the longitudinal axis of the casing 5, and the shafts 23 and 24 are arranged at one side of the respective openings. With this arrangement, the valves are swung back out of line with the openings 12 and 14 when the shafts are rotated to the valve-open position. In this manner, a substantially open path is provided between the openings 12 and 14 when the valves are open, and the obstruction to the flow of fluid and the turbulence found in the usual plunger type of valve are substantially avoided.

The shafts 23 and 24 are mounted to provide a rotation about their longitudinal axes and at the same time to provide a liquid-proof seal between the interior and exterior of the casing 5. Such a mounting is shown in Fig. 4. Referring to this figure, the casing 5 is provided with a pair of aligned openings 27 and 28 into which the journals 29 and 30 are adapted to be screwed. The journal 29 is provided with a solid head 31 adapted to fit a wrench and with an opening 32 adapted to receive the end of shaft 23. The journal 30 is provided with a head 33 adapted to fit a wrench and with an externally threaded extension 34. A packing gland 35 of suitable material is adapted to screw on the threaded extension 34 to provide a liquid-tight seal as hereinbefore indicated.

The shaft 23 extends beyond the packing nut 36 and is rigidly connected to a crank 37 by suitable means such as the key pin 38. The crank 37 is provided with a pivotal connection with a block 39, as indicated by 39a in Fig. 7, and with an extension 40 in the form of a handle 41. In a similar manner shaft 24 extends beyond packing nut 36' and is rigidly connected to crank 37' which is provided with the handle 41' and is pivotally connected with the block 39' by means of pivot pin 39a'.

A rod 42 extends downwardly through the blocks 39 and 39'. The rod 42 is provided with a slidable connection with block 39 and is rigidly connected to block 39' as indicated at 43. A compression spring 44 is positioned around the rod 42 between the blocks 39 and 39', and a compression spring 45 surrounds the rod 42 between its upper end and the block 39. Springs 46 and 47, secured to the cranks 37 and 37' at one end and to the studs 48 and 49 at the other end, tend to maintain the valves 21 and 22 in normally closed position.

A latch 50 provided with an extension 51 and a handle 52, as best shown in Fig. 5, is pivotally mounted on a stud 53 attached to casing 5. The latch is provided with a lip 54 which is adapted to hook under the pivot pin 39a' when handle 41' is pulled upwardly to open valve 22. A stop pin 51a adapted to engage extension 51 limits the rotation of latch 50 about its pivot 53 and thereby locks the crank 37' and rod 42 in valve opening position when lip 54 has engaged pin 39a'. The latch 50 also serves to maintain the valve 21 open against the action of spring 46 by means of the flexible connection between the cranks 37 and 37'. This flexible connection, however, permits valve 22 to be latched open while valve 21 is manually held closed by means of handle 41. The extension 51 is provided with an opening 55 within which a chain 56 connecting with the lug 18 on pipe 15 is adapted to be connected. If the pipe 15 should become broken at the reduced portion 17 the pull on chain 56 releases the latch from engagement with the pin 39a' and permits the springs 46 and 47 to automatically close the valves 21 and 22. The valve can be manually unlatched by pulling up on handle 41' and releasing the lip 54 from engagement with pin 39a' by means of handle 52.

The portion 57 of the latch 50 is made in two parts connected together by a fusible link 59 as illustrated in Figs. 5 and 6. In a similar manner the portion 58 of the crank arms 37 and 37' is made in two parts connected by fusible link 60, as illustrated in Figs. 7 and 8.

The elbow 3 and casing 5 are provided with outlets 61 and 62, respectively, and a suction pump 63 is connected to these outlets by means of the lines 64 and 65 as diagrammatically illustrated in Fig. 3.

In operation the valves 21 and 22 are normally maintained closed by the springs 46 and 47 and thereby prevent the escape of any fluid from the interior of the tank car 1. When it is desired to dispense fluid the operator first connects the pipe 15 to the desired receptacle and then pulls upwardly upon handle 41' to open valve 22 while holding handle 41 down to maintain the valve 21 closed. The resilient connection between the bell cranks permits the lower valve to be opened while the upper valve is maintained closed. He then operates pump 63, either manually or mechanically, to provide a suction between outlets 61 and 62, respectively. In the meantime, latch 50 has engaged the pivot pin 39a' to lock valve 22 open. When the desired syphon has been established between 61 and 62, the handle 41 is released and the innermost valve 21 opens rapidly by spring action to permit the fluid from tank 1 to flow outwardly through valves 21 and 22 and the pipe 15. Pump 63 may then be stopped. The fluid will continue to flow until the syphon is broken by pulling upward on lever 41', releasing latch 50 by means of handle 52 and permitting valves 21 and 22 to close.

If a fire or other dangerous condition develops at the station being serviced the operator can immediately drive away and the reduced portion 17 of the pipe 15 provides a breakaway connection. This causes a pull on the chain which releases the latch 50 and permits the valves 21 and 22 to automatically close by spring action. Fire or other excessive heat will also cause one or more of the fusible links 59 and 60 to melt and release one or both of the valves which are closed by the springs 46 and 47. If the link 59 melts the latch 50 is released and both valves automatically close.

It should be noted that all springs are positioned outside of the casing 5 where they are not subjected to the corrosive action of the gasoline or other fluid being dispensed, and that the break-away connection 17 is located exteriorly of the casing 5 and valves 21 and 22.

The invention is capable of many modifications and variations, and only such limitations should be imposed as are included in the appended claims.

What I claim is:

1. In a device for dispensing inflammable fluids, a faucet comprising a pair of valves arranged in series, resilient means interconnecting said valves, means for maintaining one of said valves open while the other valve is closed, and means cooperating with said resilient means for opening said other valve by spring action.

2. In a device for dispensing inflammable fluids, a faucet comprising a pair of valves arranged in series, resilient means interconnecting said valves, means for maintaining one of said valves open while the other valve is closed, means for latching said one valve open, and means cooperating with said resilient means for opening the other of said valves and maintaining said other valve latched open.

3. In a device for dispensing inflammable fluids, a faucet comprising a pair of valves arranged in series, resilient means interconnecting said valves, means for maintaining one of said valves open while the other valve is closed, means for latching said one valve open, and means cooperating with said resilient means for opening the other of said valves and maintaining said other valve latched open, and means for automatically closing both of said valves upon release of said latching means.

4. In a device for dispensing inflammable fluids, a faucet comprising a pair of valves arranged in series, resilient means interconnecting said valves, means for maintaining one of said valves open while the other valve is closed, means for latching said one valve open, means cooperating with said resilient means for opening the other of said valves and maintaining said other valve latched open, and spring means for automatically closing both of said valves upon release of said latching means.

5. In a device for dispensing inflammable fluids, a faucet comprising an elongated hollow casing, a pair of valves arranged in series within said casing, separate shaft means extending outwardly of said casing for operating each of said valves, a lever provided with a handle portion attached to each of said shaft means exteriorly of said casing, and resilient means interconnecting said levers whereby one of said valves may be closed while the other is maintained opened.

6. In a device for dispensing inflammable fluids, a faucet comprising an elongated hollow casing, a pair of valves arranged in series within said casing, separate shaft means extending outwardly of said casing for operating each of said valves, spring means for maintaining said valves normally closed, a lever provided with a handle portion attached to each of said shaft means exteriorly of said casing, resilient means interconnecting said levers whereby one of said valves may be closed while the other is maintained opened, and latch means cooperating with said levers and said resilient connection for maintaining said valves open against the action of said spring means.

7. In a device for dispensing inflammable fluids, a faucet comprising an elongated hollow casing, a pair of valves arranged in series within said casing, separate shaft means extending outwardly of said casing for operating each of said valves, spring means positioned outside of said casing and cooperating with said shaft for maintaining said valves normally closed, a lever provided with a handle portion attached to each of said shaft means exteriorly of said casing, resilient means interconnecting said levers whereby one of said valves may be closed while the other is maintained opened, and latch means cooperating with said levers and said resilient connection for maintaining said valves open against the action of said spring means.

8. A device as defined in claim 6 wherein a fusible link means is provided in at least one of said levers between said shaft and said resilient connection.

9. A device as defined in claim 6 wherein a fusible link means is provided in each of said levers between said shaft and resilient connection.

10. A device as defined in claim 6 wherein said latch is provided with fusible means adapted to release the latch.

11. In a device for dispensing inflammable fluids from a tank vehicle, a faucet comprising a pair of valves arranged in series, spring means for automatically closing said valves, latch means for maintaining said valves open, means for independently closing one of said valves, means connecting one end of said faucet with the interior of said tank vehicle, and a pump connection by-passing the independently closed valve, a pipe provided with a portion of reduced diameter extending from the opposite end of said faucet, and means cooperating with said latch means for releasing the latch means and permitting said valves to automatically close upon breakage of said pipe at said portion of reduced diameter.

12. In a device for dispensing inflammable fluids from a tank vehicle, a faucet comprising a pair of valves arranged in series, spring means for automatically closing said valves, resilient means interconnecting said valves whereby one may be closed while the other is maintained opened, latch means cooperating with said resilient connection for maintaining said valves open, means connecting one end of said faucet with the interior of said tank vehicle, a pipe provided with a portion of reduced diameter extending from the opposite end of said faucet, and means cooperating with said latch means for releasing the latch means and permitting said valves to automatically close upon breakage of said pipe at said portion of reduced diameter.

13. In a device for dispensing inflammable fluids from a tank car, a faucet comprising an elongated hollow casing, means providing a syphon connection between the interior of said casing at one end and said tank car, a pair of valves arranged in series within said casing, means including a handle positioned exteriorly of said casing for operating the outermost of said valves, means for initiating a syphon between the interior of said tank car and the interior of said casing between said valves, and means including a resilient connection between said valves for opening the innermost valve by spring action when said syphon is initiated.

ROBERT D. MARX.